US012600857B2

(12) United States Patent
Salwiczek et al.

(10) Patent No.: US 12,600,857 B2
(45) **Date of Patent: *Apr. 14, 2026**

(54) POLYETHER BLOCK AMIDE-POLY(METH)ACRYLATE FOAMS

(71) Applicant: Evonik Operations GmbH, Essen (DE)

(72) Inventors: Kathrin Salwiczek, Recklinghausen (DE); Alexander Richter, Haltern am See (DE); Christine Weiß, Dorsten (DE); Wolfgang Luley, Griesheim (DE); Andreas Weber, Frankfurt (DE); Lukas Friedrich Dössel, Hattersheim am Main (DE); David Bailey, Coesfeld (DE); Ralf Richter, Hanau (DE); Steffen Krill, Muehltal (DE); Johannes Vorholz, Alzenau (DE); Maren Kuhn, Schermbeck (DE)

(73) Assignee: Evonik Operations GmbH, Essen (DE)

( * ) Notice: Subject to any disclaimer, the term of this patent is extended or adjusted under 35 U.S.C. 154(b) by 531 days.

This patent is subject to a terminal disclaimer.

(21) Appl. No.: 17/285,373

(22) PCT Filed: Oct. 11, 2019

(86) PCT No.: PCT/EP2019/077636

§ 371 (c)(1),
(2) Date: Apr. 14, 2021

(87) PCT Pub. No.: WO2020/078856

PCT Pub. Date: Apr. 23, 2020

(65) Prior Publication Data

US 2021/0371651 A1 Dec. 2, 2021

(30) Foreign Application Priority Data

Oct. 16, 2018 (EP) .................................... 18200738

(51) Int. Cl.

| | |
|---|---|
| ***B29C 48/00*** | (2019.01) |
| ***C08F 220/14*** | (2006.01) |
| ***C08G 69/40*** | (2006.01) |
| ***C08J 3/12*** | (2006.01) |
| ***C08J 5/18*** | (2006.01) |
| ***C08J 9/00*** | (2006.01) |
| ***C08J 9/12*** | (2006.01) |
| ***C08L 33/12*** | (2006.01) |
| ***C08L 33/24*** | (2006.01) |
| ***C08L 71/02*** | (2006.01) |
| ***C08L 77/06*** | (2006.01) |
| ***C08L 87/00*** | (2006.01) |

(52) U.S. Cl.

CPC ................. *C08L 71/02* (2013.01); *C08J 3/12* (2013.01); *C08J 5/18* (2013.01); *C08J 9/0014* (2013.01); *C08J 9/0061* (2013.01); *C08J 9/12* (2013.01); *C08J 9/122* (2013.01); *C08L 33/12* (2013.01); *C08L 33/24* (2013.01); *C08L 77/06* (2013.01); *C08L 87/005* (2013.01); *C08J 2201/03* (2013.01); *C08J 2203/06* (2013.01); *C08J 2371/02* (2013.01); *C08J 2387/00* (2013.01); *C08J 2433/12* (2013.01); *C08L 2203/14* (2013.01)

(58) Field of Classification Search

CPC ............................ C08F 220/14; C08F 220/52

See application file for complete search history.

(56) References Cited

U.S. PATENT DOCUMENTS

| | | | | | |
|---|---|---|---|---|---|
| 2,146,209 | A | | 2/1939 | Graves | |
| 3,627,711 | A | | 12/1971 | Schroeder et al. | |
| 4,139,685 | A | | 2/1979 | Schroeder | |
| 4,246,374 | A | | 1/1981 | Kopchik | |
| 4,663,413 | A | | 5/1987 | Ward et al. | |
| 5,064,911 | A | * | 11/1991 | Sasaki | C08F 8/48 525/379 |
| 5,342,918 | A | | 8/1994 | Howelton et al. | |

(Continued)

FOREIGN PATENT DOCUMENTS

| | | |
|---|---|---|
| DE | 1 817 156 | 9/1975 |
| DE | 27 26 259 | 11/1985 |

(Continued)

OTHER PUBLICATIONS

U.S. Appl. No. 14/765,472, filed Aug. 3, 2015, 2015/0361236, Richter et al.

(Continued)

*Primary Examiner* — Melissa A Rioja
(74) *Attorney, Agent, or Firm* — Grüneberg Global IP, PLLC

(57) ABSTRACT

A mixture contains at least one amino-regulated polyether block amide (PEBA) and at least one poly(meth)acrylate selected from poly(meth)acrylimides, polyalkyl(meth)acrylates, and mixtures thereof. The mass ratio of PEBA to poly(meth)acrylate is 95:5 to 60:40. The polyalkyl(meth) acrylate contains 80% by weight to 99% by weight of methyl methacrylate (MMA) units and 1% by weight to 20% by weight of C1-C10-alkyl acrylate units, based on the total weight of polyalkyl(meth)acrylate. The mixture can be processed to give foamed mouldings. The mouldings can be used in footwear soles, stud material, insulation or insulating material, damping components, lightweight components, or in a sandwich structure.

17 Claims, 3 Drawing Sheets

(56) References Cited

U.S. PATENT DOCUMENTS

| | | | |
|---|---|---|---|
| 7,135,525 | B2 | 11/2006 | Petter et al. |
| 7,491,792 | B2 * | 2/2009 | Monsheimer ........... C08L 53/00 528/480 |
| 7,582,342 | B2 | 9/2009 | Baumann et al. |
| 8,598,280 | B2 | 12/2013 | Khrenov et al. |
| 9,057,466 | B2 | 6/2015 | Dowe et al. |
| 10,759,096 | B2 | 9/2020 | Smith et al. |
| 2002/0167112 | A1 | 11/2002 | Colburn, Jr. et al. |
| 2003/0162899 | A1 | 8/2003 | Baumann et al. |
| 2005/0014842 | A1 | 1/2005 | Baumann et al. |
| 2006/0108708 | A1 | 5/2006 | Wakita et al. |
| 2007/0166560 | A1 | 7/2007 | Wursche et al. |
| 2010/0221551 | A1 | 9/2010 | Wursche et al. |
| 2011/0015317 | A1 | 1/2011 | Khrenov et al. |
| 2015/0284559 | A1 | 10/2015 | Tai |
| 2015/0361236 | A1 | 12/2015 | Richter et al. |
| 2017/0253710 | A1 | 9/2017 | Smith et al. |
| 2017/0259474 | A1 | 9/2017 | Holmes et al. |
| 2018/0037701 | A1 | 2/2018 | Reyna-Valencia et al. |
| 2022/0025118 | A1 | 1/2022 | Baumann et al. |
| 2022/0040963 | A1 | 2/2022 | Seyoum et al. |
| 2022/0195145 | A1 | 6/2022 | Salwiczek et al. |
| 2022/0363901 | A1 | 11/2022 | Salwiczek et al. |

FOREIGN PATENT DOCUMENTS

| | | | |
|---|---|---|---|
| DE | 10 2008 001 695 | 11/2009 | |
| DE | 10 2014 216 992 | 3/2016 | |
| EP | 0 208 734 | 12/1990 | |
| EP | 0434244 | 2/1995 | |
| EP | 0296852 | 3/1996 | |
| EP | 1 640 418 | 6/2007 | |
| EP | 1755890 | 9/2008 | |
| EP | 1518901 | 5/2016 | |
| GB | 1045229 | 10/1966 | |
| GB | 1078425 | 8/1967 | |
| JP | H08-231770 | 9/1996 | |
| JP | 2003246926 | 9/2003 | |
| JP | 2005042111 | 2/2005 | |
| JP | 2008-502758 | 1/2008 | |
| JP | 2008-255215 | 10/2008 | |
| JP | 2017-61601 | 3/2017 | |
| JP | 2017-525819 | 9/2017 | |
| WO | 02/062890 | 8/2002 | |
| WO | WO-2006045513 A1 * | 5/2006 | ................ C08J 9/00 |
| WO | 2017/094131 | 6/2017 | |
| WO | 2017/167197 | 10/2017 | |

OTHER PUBLICATIONS

U.S. Appl. No. 17/285,354, filed Apr. 14, 2021, Salwiczek et al.

U.S. Appl. No. 17/414,674, filed Jun. 16, 2021, 2022/0025118, Baumann et al.

U.S. Appl. No. 17/595,059, filed Nov. 8, 2021, 2022/0195145, Salwiczek et al.

International Search Report issued Jan. 30, 2020 in PCT/EP2019/077636, with English Translation, 5 pages.

Written Opinion issued Jan. 30, 2020 in PCT/EP2019/077636, with English Translation, 9 pages.

International Search Report issued Jan. 20, 2020, in PCT/EP2019/078086, with English translation, 6 pages.

U.S. Office Action dated Dec. 6, 2023, in U.S. Appl. No. 17/285,354, 31 pages.

Written Opinion issued Jan. 20, 2020, in PCT/EP2019/078086, with English translation, 12 pages.

U.S. Pat. No. 8,598,280, Dec. 3, 2103, 2011/0015317, Khrenov et al.

* cited by examiner

POLYETHER BLOCK AMIDE-POLY(METH)ACRYLATE FOAMS

CROSS-REFERENCE TO RELATED APPLICATIONS

This application is the National Stage entry under § 371 of International Application No. PCT/EP2019/077636, filed on Oct. 11, 2019, and which claims the benefit of European Application No. 18200738.5, filed on Oct. 16, 2018. The content of each of these applications is hereby incorporated by reference in its entirety.

BACKGROUND OF THE INVENTION

Field of the Invention

The present invention relates to mixtures of amino-regulated polyether block amide and poly(meth)acrylates, to a foamed moulding of these mixtures, to a process for producing these mouldings and to the use thereof.

Description of Related Art

Polymer foams are used industrially on large scales. Polyether block amides (PEBA) as a constituent in foam material are already known. If, however, PEBA is foamed without additions, no stable foam is obtained: the foamed moulding collapses.

Polyether block amides (PEBA) are block copolymers which are obtained by polycondensation of (oligo)polyamides, in particular acid-regulated polyamides, with alcohol-terminated or amino-terminated polyethers. Acid-regulated polyamides have carboxylic acid end groups in excess. Those skilled in the art refer to the polyamide blocks as hard blocks and the polyester blocks as soft blocks.

WO 2017/167197 discloses polymer mixtures containing 20% to 99% of a thermoplastic and 1-80% of poly(meth)acrylimide foam particles. DE 102014216992 describes processes for producing expanded polymer pellets from polyamide, for example PEBA, which can be used, for example, for the production of damping elements for sports clothing.

SUMMARY OF THE INVENTION

In this respect, the problem addressed by the present invention was that or finding suitable mixtures based on PEBA that have a stable and lightweight foam. The density should be sufficiently low that a significant reduction in weight can be achieved in the component. Furthermore, a flexible foam that exhibits a certain flexibility and rebound or resilience characteristics was to be obtained. The foamed moulding obtained was to have high mechanical durability and high foam stability. The foam was to have a homogeneous cell distribution and a homogeneous cell size.

This problem was solved by a mixture comprising amino-regulated PEBA and at least one poly(meth)acrylate, where the mass ratio of PEBA to poly(meth)acrylate is 95:5 to 60:40. The poly(meth)acrylate is selected from poly(meth) acrylimides, polyalkyl(meth)acrylates and mixtures thereof.

DETAILED DESCRIPTION OF THE INVENTION

Figure 1:
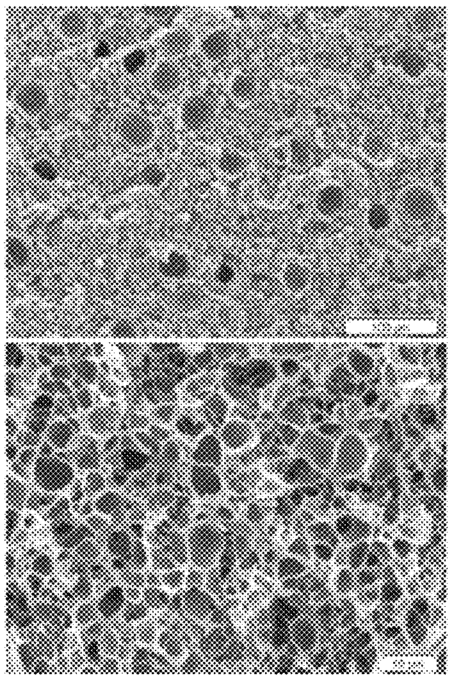
FIG. 1 shows a microscopic image of Composition 1.

PEBA can be obtained, for example, from the reaction of polyamides with polyethers such as polyether diols or polyether diamines. The preparation of PEBA is described, for example, in EP-A-1518901 (US 2005/014842).

Suitable polyamides (PA) are, for example, PA6, PA11, PA12, PA613, PA1012, PA612, PA109, PA1013, PA1010 and PA69. They can be prepared from lactams or ω-aminocarboxylic acids or from the reaction of diamines with dicarboxylic acids.

Suitable polyetherdiols are, for example, butane-1,4-diol, butane-1,3-diol, propane-1,3-diol, ethylene glycol or polytetrahydrofuran. It is also possible to use mixed polyether diol blocks with random or blockwise distribution. They generally have a number-average molar mass of about 230 to 4000.

Suitable polyether diamines are obtainable by conversion of the corresponding polyether diols by reductive amination or coupling to acrylonitrile with subsequent hydrogenation (e.g. EP-A-0434244; EP-A-0296852). They generally have a number-average molar mass of about 230 to 4000. Commercially available polyether diamines derived from propylene glycol are commercially available from Huntsman as the JEFFAMINE "D series".

The proportion of polyether in the PEBA is preferably 10% to 50% by weight, more preferably 20% to 40% by weight, based in each case on the total weight of PEBA.

Suitable PEBAs may have a Shore D hardness of 30 to 70, preferably of 35 to 65. Shore D hardness is measured to ISO 888 at 23° C.±2° C.

The PEBA is amino-regulated. This therefore has an excess or amino end groups. The amino-regulated PEBA preferably has an excess of 20 to 60 mmol of amino end groups per kg of PEBA, preferably 30 to 50 mmol/kg.

As well as PEBA, the mixtures also comprise poly(meth) acrylates, the poly(meth)acrylimides, polyalkyl(meth)acrylates or mixtures thereof. The (meth)acrylate notation here means both methacrylate, such as methyl methacrylate, ethyl methacrylate, etc., and acrylate, such as methyl acrylate, ethyl acrylate, etc., and mixtures thereof.

Poly(meth)acrylimides preferably have repeat units that can be represented by Formula (IV)

(IV)

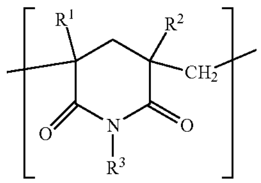

in which $R^1$ and $R^2$ are the same or different and are hydrogen or a methyl group and $R^3$ is hydrogen, an alkyl radical having 1 to 20 carbon atoms or an aryl radical having 3 to 20 carbon atoms. Preference is given to a compound (IV) in which the three radicals $R^1$, $R^2$ and $R^3$ are each a methyl group.

Preferred poly(meth)acrylimides comprise the following groups: a) N-alkylacrylimide of formula (IV), b) (meth) acrylic acid, c) (meth)acrylic anhydride, d) (meth)acrylate, where groups a)-d) are each present to an extent of at least 1% by weight, based on the total weight of poly(meth) acrylimide. Preferably, the poly(meth)acrylimide contains 10-95% by weight, preferably 20-70% by weight and more preferably 25-40% by weight of N-alkylacrylimide of the formula (IV). The sum total of groups b) and c) is preferably in the range of 5-20% by weight, more preferably in the range of 8-17% by weight and especially preferably in the range of 10-15% by weight. The poly(meth)acrylimides may contain e) further monomers. The proportion thereof is typically <10% by weight. The proportions are based on the total weight of poly(meth)acrylimide. They can be determined by means of NMR or IR spectroscopy.

Typical molecular weights $M_w$ of the poly(meth)acrylimide are in the range of 50 000-150 000 g/mol and preferably 90 000-110 000 g/mol (determined by GPC against PMMA standard).

A suitable preferred poly(meth)acrylimide is poly(N-methyl)methacrylimide (PMMI). In a particularly preferred embodiment of the invention, a poly(meth)acrylimide includes 25-35% by weight of N-alkylacrylimide of the formula (IV) in which the three radicals $R^1$, $R^2$ and $R^3$ are each a methyl group, 1% to 5% by weight of methacrylic acid groups, 5% to 20% by weight of methacrylic anhydride groups and 40% to 65% by weight of methyl methacrylate groups.

The preparation of poly(meth)acrylimides is known per se and disclosed, for example, in GB Patent 1 078 425, GB Patent 1 045 229, DE Patent 1 817 156 (=U.S. Pat. No. 3,627,711) or DE Patent 27 26 259 (=U.S. Pat. No. 4,139, 685) or DE-A-10 2008 001 695 (=US 2011/015317 A1).

In addition, these polymers may contain further monomer units that result, for example, from esters of acrylic acid or methacrylic acid, especially with lower alcohols having 1-4 carbon atoms, styrene, maleic acid or its anhydride, itaconic acid or its anhydride, vinylpyrrolidone, vinyl chloride or vinylidene chloride. The proportion of comonomers that can be cyclized only with difficulty, if at all, is not to exceed 30% by weight, preferably 20% by weight and more preferably 10% by weight, based on the weight of the monomers.

The polyalkyl(meth)acrylate can be used individually or else in a mixture of multiple different polyalkyl(meth) acrylates. In addition, the polyalkyl(meth)acrylate may also be in the form of a copolymer.

In the context of the present invention, particular preference is given to homo- and copolymers of C1-C18-alkyl (meth)acrylates, appropriately of C1-C10-alkyl (meth)acrylates, especially of C1-C4-alkyl (meth)acrylate polymers that may optionally contain different monomer units.

Polyalkyl(meth)acrylates contain 80% by weight to 99% by weight of methyl methacrylate (MMA) units and 1% by weight to 20% by weight, preferably 1% by weight to 5% by weight, of C1-C10-alkyl acrylate units, based on the total weight of polyalkyl(meth)acrylate. Particularly preferred C1-C10-alkyl acrylate units are methyl acrylate, ethyl acrylate and butyl acrylate units, and mixtures thereof.

The products and the preparation thereof are known (Hans R. Kricheldorf, Handbook of Polymer Synthesis. Part A, Verlag Marcel Dekker Inc. New York—Basle—Hongkong, p. 223 ff.: H. G. Elias, Makromoleküle [Macromolecules], Hüthig und Wepf Verlag Basle—Heidelberg—New York; U.S. Pat. Nos. 2,146,209, 4,246,374).

The use of copolymers containing 70% by weight to 99% by weight, especially 70% by weight to 90% by weight, of C1-C10-alkyl methacrylates, based on the total weight of copolymers, has been found to be very particularly useful. Preferred C1-C10-alkyl methacrylates include methyl methacrylate, ethyl methacrylate, propyl methacrylate, isopropyl methacrylate, n-butyl methacrylate, isobutyl methacrylate, tert-butyl methacrylate, pentyl methacrylate, hexyl methacrylate, heptyl methacrylate, octyl methacrylate, isooctyl methacrylate and ethylhexyl methacrylate, nonyl methacrylate, decyl methacrylate, and cycloalkyl methacrylates, for example cyclohexyl methacrylate, isobornyl methacrylate or ethylcyclohexyl methacrylate.

Very particularly preferred copolymers include 70% by weight to 99% by weight of methyl methacrylate (MMA) units and 1% by weight to 20% by weight, preferably 1% by weight to 5% by weight, of C1-C10-alkyl acrylate units, based on the total weight of copolymers, especially methyl acrylate, ethyl acrylate and/or butyl acrylate units. A further preferred comonomer is styrene.

Polymethylmethacrylate (PMMA) is a particularly preferred polyalkyl(meth)acrylate.

A polymethylmethacrylate that has been found to be useful contains 1% by weight-18% by weight of methyl acrylate and 82% by weight-99% by weight of methyl methacrylate, more preferably 2% by weight-10% by weight of methyl acrylate and 90% by weight-98% by weight of methyl methacrylate, and most preferably 3% by weight-6% by weight of methyl acrylate and 94% by weight-97% by weight of methyl methacrylate, based in each case on the total weight of methyl acrylate and methyl methacrylate. The molecular weight Mw is preferably between 70 000 g/mol and 240 000 g/mol, more preferably between 80 000 g/mol and 220 000 g/mol and most preferably between 90 000 g/mol and 200 000 g/mol. In addition, these polymers may contain further monomer units that result, for example, from esters of acrylic acid or methacrylic acid, especially with lower alcohols having 1-4 carbon atoms, maleic acid or its anhydride, itaconic acid or its anhydride, vinylpyrrolidone, vinyl chloride or vinylidene chloride. The proportion of comonomers that can be cyclized only with difficulty, if at all, is not to exceed 30% by weight, preferably 20% by weight and more preferably 10% by weight, based on the weight of the monomers. Cyclizable monomers are understood to mean α-, β-unsaturated functionalized systems that bear a functionality described in the literature as an EWG (=electron-withdrawing group) on the vinylic radical. Examples of systems having EWG functionality include molecules with a nitrile group or carboxylic acids and esters thereof. These do not include non-cyclizable but vinylically polymerizable monomers; examples of these include α-methylstyrene, styrene, vinyl acetate, vinylpyrrolidone, ethylene, propylene, vinyl chloride, vinylidene chloride, isoprene, butadiene, vinyl ether or isobutylene.

It is likewise possible to use impact-modified polymers. A preferred impact-modified polymer has a core/shell structure. Particular preference is given to polybutadiene-based cores grafted with a shell. The shell may be selected from methyl methacrylate, methyl acrylate, ethyl (meth)acrylate, styrene, acrylonitrile and mixtures thereof. Such polymers are described by way of example in WO 2002/062890 A1.

The polyalkyl(meth)acrylate may be prepared by polymerization methods known per se, particular preference being given to free-radical polymerization methods, especially bulk, solution, suspension and emulsion polymerization methods. Initiators that are particularly suitable for these purposes especially include azo compounds such as 2,2'-azobis(isobutyronitrile) or 2,2'-azobis(2,4-dimethylvaleronitrile), redox systems, for example the combination of tertiary amines with peroxides or sodium bisulfite and persulfates of sodium, potassium or ammonium or preferably peroxides (cf., for example, H. Rauch-Puntigam, Th. Völker, “Acryl- und Methacrylverbindungen” [Acrylic and Methacrylic Compounds], Springer, Heidelberg, 1967 or Kirk-Othmer, Encyclopedia of Chemical Technology, Vol. 1, pages 386 ff., J. Wiley, New York, 1978). Examples of particularly suitable peroxide polymerization initiators are dilauroyl peroxide, tert-butyl peroctoate, tert-butyl perisononanoate, dicyclohexyl peroxydicarbonate, dibenzoyl peroxide and 2,2-bis(tert-butylperoxy)butane. It is also possible with preference to conduct the polymerization with a mixture of different polymerization initiators of different half-life, for example dilauroyl peroxide and 2,2-bis(tert-butylperoxy)butane, in order to keep the flow of free radicals constant over the course of the polymerization and at different polymerization temperatures. The amounts of polymerization initiator used are generally 0.01% by weight to 2% by weight, based on the monomer mixture.

The polymerization can be conducted either continuously or batchwise. After the polymerization, the polymer is obtained via conventional isolation and separation steps, for example filtration, coagulation, spray-drying or flash extrusion. In the case of sheet polymers (bulk material), there is generally no further workup in the above sense.

The chain lengths of the polymers or copolymers can be adjusted by polymerization of the monomer or monomer mixture in the presence of molecular weight regulators such as, in particular, the mercaptans known for the purpose, for example n-butyl mercaptan, n-dodecyl mercaptan, 2-mercaptoethanol or 2-ethylhexyl thioglycolate, pentaerythritol tetrathioglycolate, where the molecular weight regulators are used generally in amounts of 0.05% by weight to 5% by weight, based on the monomer or monomer mixture, preferably in amounts of 0.1% by weight to 2% by weight and more preferably in amounts of 0.2% by weight to 1% by weight, based on the monomer or monomer mixture (cf., for example, H. Rauch-Puntigam, Th. Völker, “Acryl- und Methacrylverbindungen”, Springer, Heidelberg, 1967; Houben-Weyl, Methoden der organischen Chemie [Methods of Organic Chemistry], vol. XIV/1, page 68, Georg Thieme, Heidelberg, 1961 or Kirk-Othmer, Encyclopedia of Chemical Technology, vol. 1, pages 296 ff., J. Wiley, New York, 1978). Particular preference is given to using n-dodecyl mercaptan as molecular weight regulator.

The mixture according to the invention preferably contains at least one compound of formula (I)

(I)

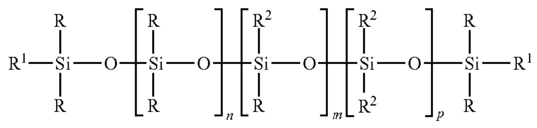

where

R are independently an alkyl radical having 1 to 11, preferably 1 to 4, carbon atoms, preferably a methyl radical, $R^1$ are independently R or a polyester radical, $R^2$ are independently R or a hydrocarbon radical having 12 to 36 carbon atoms, preferably from 14 to 30 carbon atoms, preferably from 16 to 26 carbon atoms, n, m and p are independently of one another from 0 to 58, with the proviso that N=n+m+p+2 is from 10 to 100, preferably 15 to 60, and that all $R^1$ are not R when all $R^2$ are R and at least one $R^2$ is not R when all $R^1$ are R and/or that all radicals $R^1$ are not R when m and p are zero and that m or p, preferably m, is not 0 when all radicals $R^1$ are R as a phase transfer reagent. These are polyester siloxanes or alkyl siloxanes.

The indices used in the formulae should be regarded as statistical averages (number averages).

Compounds present with preference are those of formula (I) where p=0.

If the $R^1$ radicals are polyester radicals, these are formed preferably from 3 to 30, more preferably from 8 to 25 and especially preferably from 15 to 22 ester units. As starter alcohols the polyester radicals may include those alcohol radicals that derive from primary unsaturated alcohols (see preparation process). The polyester radicals preferably have a structure of formula (II):

$$—R_q—(R_r)_zH \quad (II)$$

with $R_q$=—$(CH_2)_x$—O—, $R_r$=C(O)—$(CH_2)_y$—O— x=2 to 10, preferably 3 to 7, especially 6, and y=2 to 10, preferably 3 to 8 and more preferably 4 or 5.

Z=3 to 30, preferably from 8 to 25 and especially preferably from 15 to 22.

The designations “q” and “r” serve merely to distinguish the radicals from the other “R” radicals and do not represent indices associated with any numerical value.

The polyester radicals may have been formed from identical or different starting molecules. The polyester radicals have preferably been formed from identical starting molecules. Preferred polyester radicals are those that are obtained by preferably ring-opening (poly)esterification of lactones. Particularly preferred polyester radicals are those obtained by (poly)esterification of caprolactone or valerolactone, especially of ε-caprolactone, 3,5,5-trimethylcaprolactone or δ-valerolactone and especially preferably of ε-caprolactone. Preferred compounds of the formula (I) in which $R^1$ are polyester radicals are those where the polyester radical has been formed from 3 to 30, preferably from 8 to 25 and especially preferably from 15 to 22 ε-caprolactone units. The R1 radicals are preferably identical polyester radicals.

When the $R^1$ radicals are all R, where R is preferably a methyl radical, $R^2$ is preferably a hydrocarbon radical having 12 to 36 carbon atoms, preferably from 14 to 30 carbon atoms, more preferably from 16 to 26 carbon atoms, N is preferably not less than 30, by preference from 40 to 50. p in the case mentioned is preferably 0 and m is preferably from 30 to 48.

When one or more of the $R^1$ radicals are a polyester radical, N is preferably 10 to 45, preferably 18 to 35 and especially preferably 20 to 30.

Suitable compounds of the formula (I) are, for example, TEGOMER® H-Si 6440 P and TEGOPREN 6846, available from Evonik.

The compounds of the formula (I) can be obtained by the known processes by reaction of corresponding hydrosiloxanes with unsaturated hydrocarbons or unsaturated alcohols and subsequent (poly)esterification or by direct reaction of unsaturated polyesters with hydrosiloxanes. The reaction can be effected as described in EP 1 640 418 by hydrosilylation/by dehydrogenative hydrosilylation. The preparation of polysiloxanes comprising polyester radicals can be found in EP 0 208 734 for example.

The at least one compound of the formula (I) is preferably present in a proportion of 0.1% to 10% by weight, based on the total weight of the homogeneous mixture (including the at least one compound of formula (I) and the at least one compound of the formula (II)). The proportion of polyester siloxanes is preferably in the range from 0.5% to 8% by weight, especially preferably in the range from 0.9% to 5% by weight. The proportion of alkylsiloxanes is preferably in the range from 0.4% to 9% by weight, especially preferably in the range from 0.9% to 6% by weight.

The mixture according to the invention preferably further includes at least one compound of the formula (III)

$$R^3O(SO)_a(EO)_b(PO)_c(BO)_dR^4 \quad \text{(III)}$$

where $R^3$=a straight-chain or branched or cycloaliphatic radical having 2 to 30 carbon atoms, $R^4$=hydrogen, an acyl radical, alkyl radical or carboxylic acid radical in each case having 1 to 8 carbon atoms, SO=styrene oxide, EO=ethylene oxide, PO=propylene oxide, BO=butylene oxide and a=1 to 5, b=3 to 50, c=0 to 10, d=0 to 10, where a, c or d are not 0, b>=a+c+d, as a phase transfer reagent. These are styrene oxide polyethers.

The different alkylene oxide monomers and the proportion thereof in the overall polymer make it possible to specifically control the hydrophobicity/hydrophilicity balance. Particularly preferred are blockwise arrangements with terminal, comparatively hydrophobic groups such as propylene oxide or in particular butylene oxide.

As is well known, fatty alcohol polyglycol ethers are substances produced on an industrial scale, in particular by addition reaction of ethylene oxide and/or propylene oxide in the presence of acidic or basic catalysts according to the prior art, preferably under pressure and at elevated temperature. Depending on the nature of the catalyst used, the products may have a more or less condensed homologue distribution.

However, the hydroxyl-terminated polyalkylene oxides thus formed may also be esterified with carboxylic acids and/or anhydrides thereof in order to achieve capping of the OH group. The esterification reaction may be performed with aliphatic or aromatic carboxylic acids having 2 to 18 carbon atoms. The esterification can be carried out in a manner known per se under acid catalysis. It is also possible to choose etherification as the end group capping reaction instead of esterification. To this end the compounds are reacted in accordance with the prior art with aromatic or aliphatic straight-chain or branched alkyl halides under Wllliamson ether synthesis conditions. The reaction with methyl chloride is particularly preferred. The hydroxyl end groups can be partly or fully etherified in this way.

The at least one compound of formula (III) is preferably present in a proportion of 0.1% to 20% by weight based on the total weight of the homogeneous mixture (including the at least one compound of formula (I) and the at least one compound of formula(III)). The proportion of styrene oxide polyether is preferably in the range from 0.9% to 15% by weight, particularly preferably in the range from 2% to 12% by weight.

The mixture according to the invention may contain both at least one compound of formula (I) and at least one compound of formula (III).

The mixtures according to the invention preferably contain additives such as colourants, pigments, organic dyes, light stabilizers, UV stabilizers, UV absorbers, IR absorbers, antimicrobial actives, flame retardants, heat stabilizers, antioxidants, crosslinking polymers, organic or inorganic fibre-reinforcing additives, impact modifiers and mixtures thereof. The mixtures according to the invention preferably contain not more than 10% by weight, more preferably not more than 5% by weight and especially not more than 2% by weight of auxiliaries and fillers, based in each case on the total weight of mixture and additive.

The invention further provides foamed mouldings obtainable from the mixture according to the invention. The mouldings preferably have a density of not more than 350 $kg/m^3$, preferably of not more than 130 $kg/m^3$.

A process 1 for producing a foamed moulding of the invention comprises the steps of a. melting a mixture according to the invention, b. extruding the molten mixture to obtain pellets, c. injection-moulding the pellets to obtain a moulding or an extruded sheet and d. introducing the moulding or the extruded sheet into an autoclave and treating with a physical blowing agent to obtain a foamed moulding.

The process 1 can be conducted, for example, as follows: Pellets formed from PEBA and poly(meth)acrylate are metered as a dry premixture or individually via gravimetric or volumetric metering balances into a compounder preheated to the appropriate temperature (e.g. twin-screw compounder from Coperion or Berstorff or single-screw compounder from Buss or other standard models). In the corresponding screw, at the appropriate speed, the pellets are heated to form a melt. In the compounder, the mixture is heated at a suitable screw speed to form a melt. The melt is pressed through a die plate to form melt strands. These melt strands can be cooled down in a water bath, for example to room temperature. The cooled and hardened strands are chopped into pellets in a strand pelletizer.

Alternatively, they can be chopped into pellets and cooled down by means of underwater pelletization (obtainable, for example, from Econ, BKG, Gala). The pellets formed are dried in dry air dryers at 50 to 95° C., for example, for several hours to give a reduced water content, for example 0.001% to 0.1%. The dried pellets are processed to sheets, for example on a multi-zone screw injection moulding machine at a barrel temperature of 150 to 300° C. The injection mould is then cooled. Cubic test specimens can be sawn out of the resultant injection-moulded sheets. The test specimens can then be saturated with $CO_2$ in a standard autoclave at a pressure of 100 to 400 bar and a temperature of 80 to 180° C. over a period of several hours. The foaming proceeds with spontaneous expansion.

A further process 2 comprises the steps of a. melting a mixture according to the invention and b. treating the molten mixture with a physical blowing agent and extruding the molten mixture by means of a perforated plate or suitable dies to obtain a foamed moulding.

The process 2 can be conducted, for example, as follows: Pellets formed from PEBA and poly(meth)acrylate are metered as a dry premixture or individually via gravimetric or volumetric metering balances into a compounder preheated to the appropriate temperature (e.g. twin-screw compounder from Coperion or Berstorff or single-screw compounder from Buss or other standard models). In the corresponding screw, at the appropriate speed, the pellets are heated to form a melt. The blowing agent, for example $CO_2$, is added to the melt and distributed therein. In a second screw, the melt is cooled down, one reason being that the blowing agent has a viscosity-reducing effect. The die plate used here is, for example, a slot die corresponding to the desired geometry in terms of thickness and width. At this die, the melt will spontaneously expand (foam) on exit and cool down to give a foamed extrudate. In accordance with the desired geometry, the foamed extrudate can be drawn off either with the aid of a calender as a sheet or with the aid of other continuous draw-off devices (known from profile extrusion) and cooled down. After a successful cooling process, the foamed extrudate is cut to the corresponding desired length.

The process 2 is a continuous process and is therefore preferable over process 1.

The foamed component may be used as a footwear sole, as stud material, as insulation or insulating material, as a damping component, as a lightweight component or in a sandwich structure.

EXAMPLES

Dry premixtures containing PEBA and poly(meth)acrylate were produced from pellets. These mixtures were metered at a throughput of 20 kg/h by means of gravimetric metering balances into the Coperion ZSK25 WLE twin-screw compounder preheated to 240° C. The screw configuration used was a standard screw as, for example, for the production of polyamide compounds. In the twin-screw compounder, the mixture was heated at a screw speed of 250 rpm to give a melt. The melt was pressed through a 3-hole die plate with diameter 4 mm in each case to give melt strands. These melt strands were cooled down in a water bath at room temperature. The cooled and hardened strands were chopped into pellets in a standard strand pelletizer. The resultant pellets were dried in dry air dryers at 80° C. for 12 h to a water content of <0.02%. The dried pellets were processed on a standard injection moulding machine (Engel Victory 650/200) with a standard 3-zone screw at a barrel temperature of 240° C. to give sheets. The injection mould was cooled to 40° C. Cubic test specimens having either edge lengths of 30×10×5 mm or edge lengths of 40×30×10 mm were sawn out of the resultant injection-moulded sheets. The test specimens were saturated with $CO_2$ in a standard autoclave over a period of 4.5 h (small specimens) or 95 h (large specimens) at a pressure of 300 bar and a temperature of 140° C. The foaming proceeded with spontaneous expansion.

The following substances were used:

PEBA 1: amino-terminated PEBA containing 30% by weight of polyether blocks (VESTAMID® E58-S4)

PEBA 2: carboxyl-terminated PEBA containing 20% by weight of polyether blocks (VESTAMID® E62-S3)

(Meth)acrylate 1: polymethylmethacrylimide, as described in EP 1 755 890 B1, having a molecular weight of 100 000 g/mol (determined by GPC against PMMA standard), consisting of 30% by weight of units of formula IV, where $R^1$, $R^2$ and $R^3$ are each a methyl group, of 57% by weight of methyl methacrylate (MMA) units, of 10% by weight of methacrylic anhydride (MA) units and of 3% by weight of methacrylic acid (MAA) units (determined by IR spectroscopy).

(Meth)acrylate 2: impact-modified poly(meth)acrylate, having a molecular weight of 200 000 g/mol (determined by GPC against PMMA standard), consisting of 55% by weight of methyl methacrylate (MMA) units, 20% by weight of styrene units, 2% by weight of ethyl acrylate (EA) units and 23% by weight of rubber. The rubber is polybutadiene, grafted with a shell of MMA units and styrene units, and with an active diameter for impact modification (corresponding to an average agglomerate diameter) of 300 nm (determined by transmission electron microscopy).

(Meth)acrylate 3: impact-modified poly(meth)acrylate, as (meth)acrylate 2, here with a molecular weight of 140 000 g/mol (determined by GPC against PMMA standard).

PA12: carboxyl-terminated nylon-12 (VESTAMID® L1901)

TABLE 1

Compositions #1 to #9 used.

| | Polyamide | Poly(meth)acrylate | Density in kg/cm$^3$ (unfoamed) |
|---|---|---|---|
| #1* | 99% by wt. of PEBA 1 | 1% by wt. of (meth)acrylate 1 | 1042/1030 |
| #2 | 90% by wt. of PEBA 1 | 10% by wt. of (meth)acrylate 1 | 1045 |
| #3 | 80% by wt. of PEBA 1 | 20% by wt. of (meth)acrylate 1 | 1062 |
| #4 | 70% by wt. of PEBA 1 | 30% by wt. of (meth)acrylate 1 | 1079 |
| #5* | 70% by wt. of PEBA 2 | 30% by wt. of (meth)acrylate 1 | 1069 |
| #6* | 70% by wt. of PA12 | 30% by wt. of (meth)acrylate 1 | 1065 |
| #7 | 70% by wt. of PEBA 1 | 30% by wt. of (meth)acrylate 2 | 1032/1049 |
| #8 | 70% by wt. of PEBA 1 | 30% by wt. of (meth)acrylate 3 | 1005/1047 |
| #9* | 100% by wt. of PEBA 1 | — | 1010 |

*non-inventive

Figure 2:
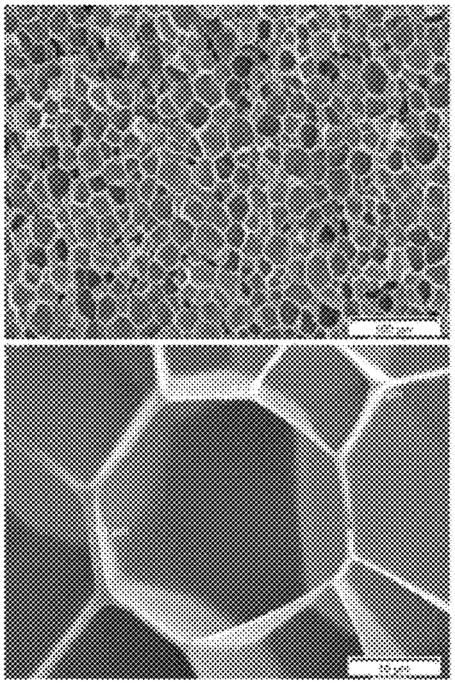
FIG. 2 shows a microscopic image of Composition 2.
Figure 3:
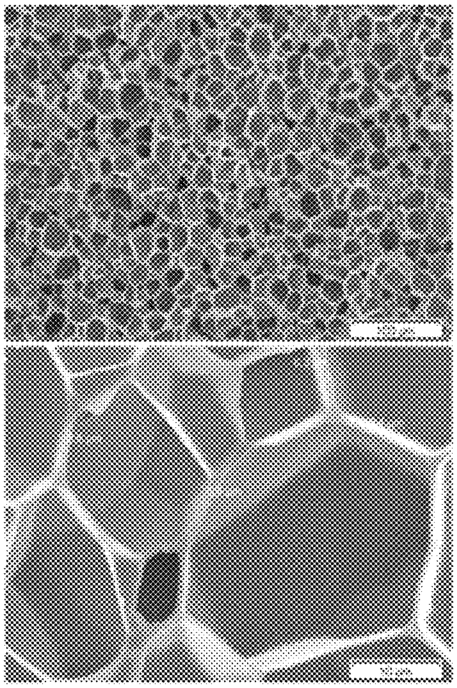
FIG. 3 shows a microscopic image of Composition 3.
Figure 4:
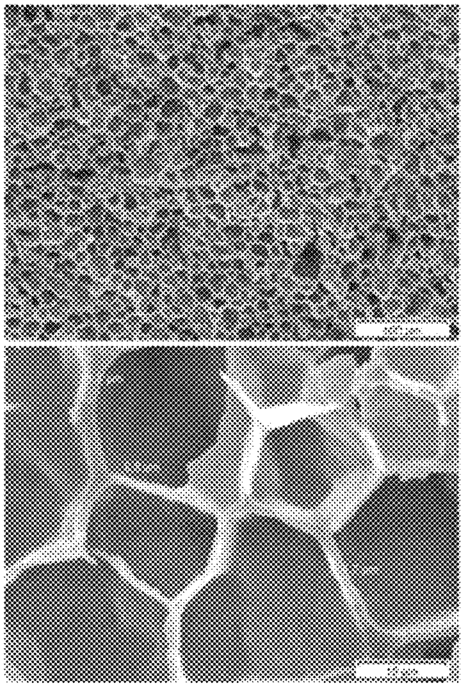
FIG. 4 shows a microscopic image of Composition 4.
Figure 5:
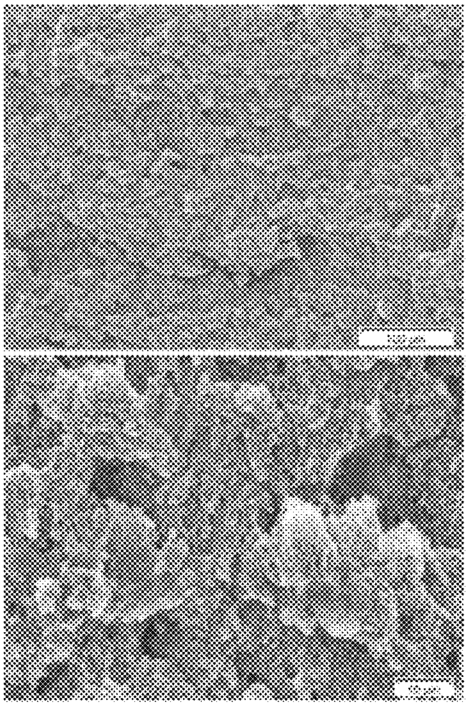
FIG. 5 shows a microscopic image of Composition 5.
Figure 7:
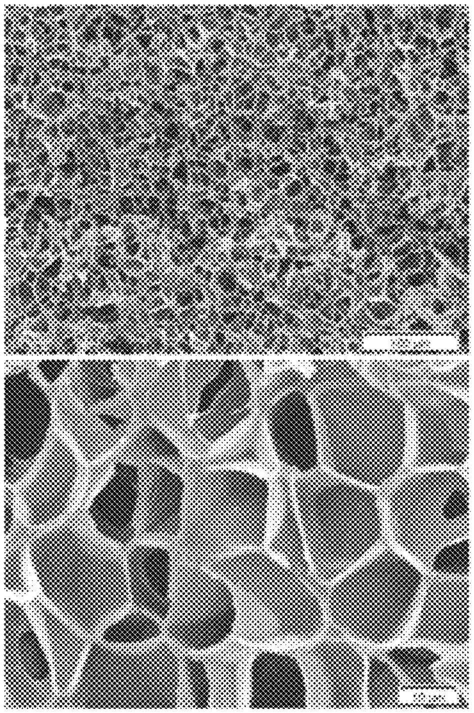
FIG. 7 shows a microscopic image of Composition 7.
Figure 6:
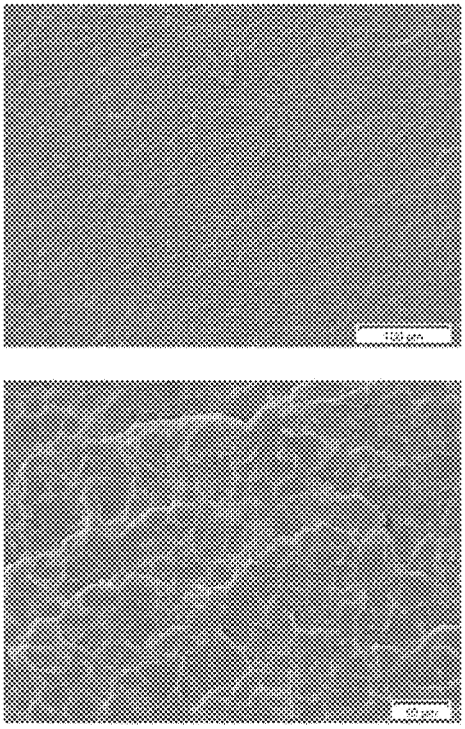
FIG. 6 shows a microscopic image of Composition 6.
Figure 8:
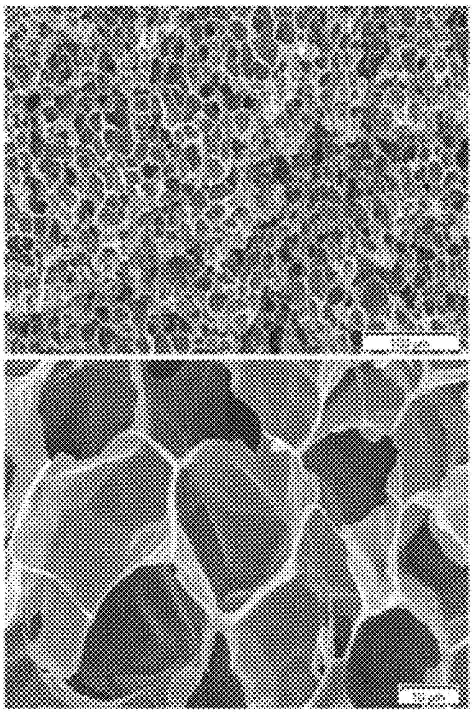
FIG. 8 shows a microscopic image of Composition 8.
Figure 9:
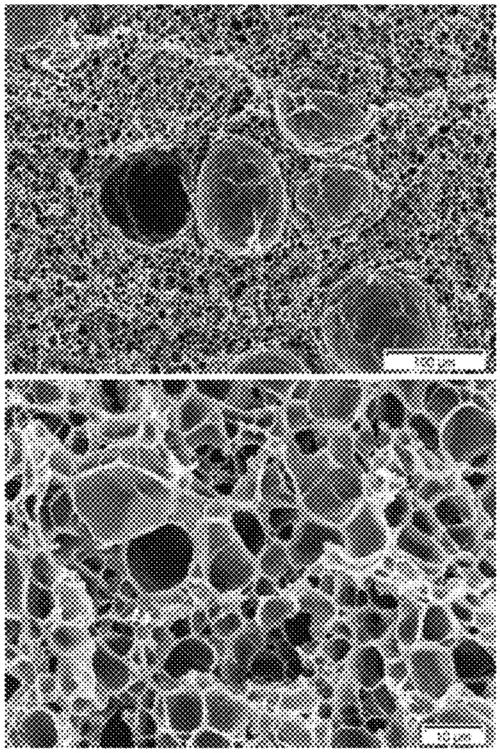
FIG. 9 shows a microscopic image of Composition 9.

Thereafter, the foamed compositions were visually examined under a scanning electron microscope and the following properties were ascertained or calculated:

$d_{cell}$: average diameter of the cells in μm
$t_{cell}$: average thickness of the cell walls in μm
$N_{cell}$: number of cells per $cm^3$
ρ: density of the foamed material in $kg/cm^3$
Δρ: change in density compared to unfoamed material
Foam quality: Visual assessment of the foams with reference to FIGS. 1 to 9 at different resolutions
1: inhomogeneous cell distribution, nonuniform cells
2: homogeneous cell distribution, uniform cell size

TABLE 2

Physical measurement data of compositions #1 to #9.

| | T in ° C. | $d_{cell}$ | $t_{cell}$ | $N_{cell}$ | ρ | Δρ | Foam quality |
|---|---|---|---|---|---|---|---|
| #1* | 140 | 6 | 0.5 | $48 \cdot 10^9$ | 460 | 55% | 1 |
| #2 | 140 | 25 | 0.9 | $0.11 \cdot 10^9$ | 110 | 89% | 2 |
| #3 | 140 | 24 | 0.9 | $0.14 \cdot 10^9$ | 110 | 90% | 2 |
| #4 | 140 | 23 | 1.2 | $0.14 \cdot 10^9$ | 260 | 76% | 2 |
| #5* | 140 | 0.7 | <0.5 | $7500 \cdot 10^9$ | 650 | 40% | 1 |
| #6* | 140 | *** | *** | *** | 900 | 15% | 1 |
| #7 | 140 | 20 | 0.7 | $0.24 \cdot 10^9$ | 110 | 90% | 2 |
| #8 | 140 | 23 | <0.5 | $0.12 \cdot 10^9$ | 90 | 91% | 2 |
| #9* | 140 | ** | ** | ** | ** | ** | 1 |

*non-inventive
** foam collapsed
*** not determined, since density too high

The foams of the inventive compositions #2 to 4 and #7 and #8, compared to the prior art compositions, showed a high cell diameter $d_{cell}$ of 21 to 25 μm and a reduced number of cells per cubic centimetre $N_{cell}$. The density was in the range from 90 to 260 $kg/cm^3$ and was reduced compared to the starting material by 76% to 91%. In addition, the foams of the composition according to the invention show a homogeneous cell distribution with cells of virtually equal size (cf. FIGS. 2 to 4, 7 and 8).

In the case of the prior art materials, distinctly lower reductions in density of 15% to 55% were recorded (#1, #5, #6); the average diameters of the cells were likewise below the values for the inventive compositions (#1, #5). Mixture #6 showed such a high density that diameter and the number of cells could not be determined. The foam of mixture #9 collapsed. The foam structures had an inhomogeneous cell distribution with cells of different size (cf. FIGS. 1, 5, 6 and 9).

The non-inventive compositions #1 (PEBA content 99% by weight), #5 (carboxyl-terminated PEBA), #6 (nylon-12 rather than PEBA) and #9 (PEBA without acrylate) were found to be unsuitable foam materials. Inventive mixtures #2 to #4 and #6 and #7 composed of amino-terminated PEBA with higher poly(meth)acrylate contents compared to mixture #1 showed homogeneous, regular cells.

The invention claimed is:

1. A foamable mixture, comprising:

a) at least one amino-regulated polyether block amide (PEBA), b) at least one poly(meth)acrylate selected from the group consisting of poly(meth)acrylimides, polyalkyl(meth) acrylates, and mixtures thereof, and a physical blowing agent, wherein the mass ratio of the at least one amino-regulated PEBA to the at least one poly(meth)acrylate is in the range from 95:5 to 60:40, the polyalkyl(meth)acrylate, if present, contains 80% by weight to 99% by weight of methyl methacrylate (MMA) units and 1% by weight to 20% by weight of $C_1$-$C_{10}$-alkyl acrylate units, based on the total weight of the polyalkyl(meth)acrylates, the poly(meth)acrylimides, if present, comprise the following groups:

a') an N-alkylacrylimide of formula (IV)

(IV)

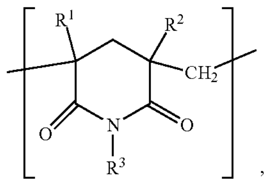

wherein $R^1$ and $R^2$ are the same or different, and are hydrogen or a methyl group, and $R^3$ is hydrogen, an alkyl radical having 1 to 20 carbon atoms, or an aryl radical having 3 to 20 carbon atoms, b) a (meth)acrylic acid, c) a (meth)acrylic anhydride, and d) a (meth)acrylate, wherein groups a') to d') are each present to an extent of at least 1% by weight, based on a total weight of the poly(meth)acrylimides, the poly(meth)acrylimides do not contain further monomers; and a foam molding produced therefrom has a density of not more than 350 $kg/m^3$.

2. The foamable mixture according to claim 1, wherein the at least one amino-regulated PEBA contains 20 to 60 mmol/kg of amino end groups.

3. The foamable mixture according to claim 1, wherein the fraction of polyether in the at least one amino-regulated PEBA contains 10% to 50% by weight, based on the total weight of the at least one amino-regulated PEBA.

4. The foamable mixture according to claim 1, wherein the at least one amino-regulated PEBA has a Shore D hardness of 30 to 70, measured to ISO 868 at 23° C.±2° C.

5. The foamable mixture according to claim 1, wherein the poly(meth)acrylimides contain 10-95% by weight of units of the formula (IV).

6. The foamable mixture according to claim 1, wherein the at least one poly(meth)acrylate comprises a poly(meth) acrylimide, and wherein the molecular weight Mw of the poly(meth)acrylimide is in the range from 50,000 to 150,000 g/mol, determined by GPC against PMMA standard.

7. The foamable mixture according to claim 1, wherein the polyalkyl(meth)acrylates contain styrene as a comonomer.

8. The foamable mixture according to claim 1, wherein the polyalkyl(meth)acrylates are impact modified polymers.

9. The foamable mixture according to claim 1, wherein the mixture contains at least one component selected from the group consisting of colorants, pigments, organic dyes, light stabilizers, UV stabilizers, UV absorbers, IR absorbers, antimicrobial actives, flame retardants, heat stabilizers, antioxidants, crosslinking polymers, organic or inorganic fiber-reinforcing additives, impact modifiers, and mixtures thereof.

10. A foamed molding obtainable from the foamable mixture according to claim 1.

11. A process for producing a foamed molding, the process comprising:

a) melting the mixture according to claim 1, thereby obtaining a molten mixture, b) extruding the molten mixture to obtain pellets, c) injection molding the pellets to obtain a molding or an extruded sheet, and d) introducing the molding or the extruded sheet into an autoclave and treating with a physical blowing agent to obtain the foamed molding.

12. A process for producing a foamed molding, the process comprising:

a) melting the mixture according to claim 1, thereby obtaining a molten mixture, and b) treating the molten mixture with a physical blowing agent and extruding the molten mixture with a perforated plate or a die to obtain the molding.

13. A method for preparing a footwear sole, a stud material, an insulation orinsulating material, a damping component, a lightweight component, or a sandwich structure, the method comprising:

producing the foamed molding according to claim 10.

14. The mixture according to claim 2, wherein the at least one amino-regulated PEBA contains 30 to 50 mmol/kg of amino end groups.

15. The mixture according to claim 4, wherein the at least one amino-regulated PEBA has a Shore D hardness of 35 to 65, measured according to ISO 868 at 23° C.±2° C.

16. The mixture according to claim 5, wherein the poly (meth)acrylimides contain 25-40% by weight of units of the formula (IV).

17. The foamable mixture according to claim 1, wherein a foam molding produced therefrom has a density of not more than 130 $kg/m^3$.

* * * * *